United States Patent
Tu et al.

(10) Patent No.: US 12,389,279 B2
(45) Date of Patent: Aug. 12, 2025

(54) METHOD AND SYSTEM FOR ADJUSTING SERVICE PRIORITY OF USER, AND STORAGE MEDIUM

(71) Applicant: ZTE Corporation, Shenzhen (CN)

(72) Inventors: Xiaoyong Tu, Shenzhen (CN); Xiliang Liu, Shenzhen (CN); Jianhua Liu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 406 days.

(21) Appl. No.: 18/013,438

(22) PCT Filed: May 24, 2021

(86) PCT No.: PCT/CN2021/095574
§ 371 (c)(1),
(2) Date: Dec. 28, 2022

(87) PCT Pub. No.: WO2022/001485
PCT Pub. Date: Jan. 6, 2022

(65) Prior Publication Data
US 2023/0269627 A1    Aug. 24, 2023

(30) Foreign Application Priority Data

Jun. 28, 2020  (CN) .......................... 202010596928.6

(51) Int. Cl.
*H04W 28/00* (2009.01)
*H04W 28/16* (2009.01)

(52) U.S. Cl.
CPC .................................. *H04W 28/16* (2013.01)

(58) Field of Classification Search
CPC .................................................... H04W 28/16
See application file for complete search history.

(56) References Cited

U.S. PATENT DOCUMENTS

2019/0007992 A1\* 1/2019 Kim ...................... H04W 76/27
2019/0053104 A1   2/2019 Qiao et al.
(Continued)

FOREIGN PATENT DOCUMENTS

CA       3057328 A1    9/2018
CN     102577449 A     7/2012
(Continued)

OTHER PUBLICATIONS

International Search Report for corresponding application PCT/CN2021/095574 filed May 24, 2021; Mail date Aug. 25, 2021.
(Continued)

*Primary Examiner* — Khai M Nguyen
(74) *Attorney, Agent, or Firm* — CANTOR COLBURN LLP

(57) ABSTRACT

A method and system for adjusting a service priority of a user, and a storage medium are provided. The method for adjusting a service priority of a user includes: an AF sends service priority change information of UE to a PCF; the PCF notifies an SMF corresponding to an activated PDU Session to deactivate a PDU Session activated by the UE, and to notify the UE to reestablish a PDU Session; an AMF receives a PDU Session establishment request sent by the UE and sends a service authorization request message to the PCF; the PCF modifies a first S-NSSAI into a changed S-NSSAI corresponding to the service priority change information, sends a service authorization response message to the AMF, and establishes a new PDU Session for the UE, wherein an S-NSSAI of the new PDU Session is the changed S-NSSAI.

20 Claims, 6 Drawing Sheets

(56) References Cited

U.S. PATENT DOCUMENTS

| | | | |
|---|---|---|---|
| 2019/0053147 A1 | 2/2019 | Qiao et al. | |
| 2019/0166016 A1 | 5/2019 | Livanos | |
| 2020/0196227 A1* | 6/2020 | Young | G06F 9/45558 |
| 2022/0141700 A1* | 5/2022 | Hedman | H04W 28/0289 370/230 |
| 2022/0345879 A1* | 10/2022 | Park | H04W 80/10 |
| 2023/0036993 A1* | 2/2023 | Velev | H04W 48/18 |

FOREIGN PATENT DOCUMENTS

| | | | |
|---|---|---|---|
| CN | 103428764 A | * | 12/2013 |
| CN | 109964509 A | | 11/2017 |
| CN | 107820291 A | | 3/2018 |
| CN | 108012267 A | | 5/2018 |
| CN | 110214459 A | | 9/2019 |
| CN | 110225563 A | | 9/2019 |
| CN | 110431888 A | | 11/2019 |
| CN | 111200859 A | | 5/2020 |
| JP | 2019534653 A | | 11/2019 |
| KR | 20190056914 A | | 5/2019 |

OTHER PUBLICATIONS

European Search Report for corresponding application EP21833557; Report dated Jun. 9, 2023.
Chinese Search Report for Application No. 2020105969286, dated Nov. 30, 2023, 15 pages.
Huawei Technologies, "pCR TR 32.899 Network Slicing", 3GPP TSG SA WG5 (Telecom Management) Meeting #113, S5-173236, May 8-12, 2017, 4 pages.
Japanese Office Action for Application No. 2022-580856, dated Feb. 25, 2025, 6 pages.
Qualcomm Incorporated, "TS 23.501: Handling of PDU sessions at slice unavailability", SA WG2 Meeting #121, S2-174018, May 15-19, 2017, 9 pages.

* cited by examiner

METHOD AND SYSTEM FOR ADJUSTING SERVICE PRIORITY OF USER, AND STORAGE MEDIUM

CROSS REFERENCE

This application is a National Stage Filing of the PCT International Application No. PCT/CN2021/095574 filed on May 24, 2021, which claims priority to Chinese Patent Application No. 202010596928.6 filed on Jun. 28, 2020, the entirety of which is herein incorporated by reference.

TECHNICAL FIELD

The present disclosure relates to the field of mobile communications, and for example, relates to a method and system for adjusting a service priority of a user, and a storage medium.

BACKGROUND

Currently, mobile communication technology has developed to the 5th Generation (5G) stage. Compared with previous network architectures, the main feature of a 5G network architecture is a servitization-based architecture. The 5G network supports various scenarios, and different scenarios have different requirements on functions and performances of the network. A Network Slicing (NS) technology can enable an operator to slice, on the same set of hardware infrastructure, a plurality of virtual logical end-to-end networks according to requirements. Network slices are logically isolated from each other, and may adapt to different feature requirements of various types of services. For example, the network slices may simultaneously satisfy different requirements, for the network, of services requiring high Quality of Service (QoS) assurance and of services requiring general QoS assurance.

After network slicing, in order to better use network resources, a dedicated Network Slice Instance (NSI) may be created in the network, so as to ensure a service of a high-priority user or a high-priority service. If a normal user subscribes to a short-term or long-term or other forms of VIP services by means of an Application (APP) or a Service Provider (SP) website or other manners due to poor service QoS assurance and poor service experience, then the user is upgraded to a high-priority user, or some services used by the user are upgraded to high-priority services.

However, if a normal-priority user has established a Packet Data Unit Session (PDU Session), then in order to ensure service experiences of these users, how to switch the established PDU Session to a dedicated NSI, so as to improve the service QoS assurance level of the user is a problem to be urgently solved at present.

SUMMARY

Some embodiments of the present disclosure provide a method and system for adjusting a service priority of a user, and a storage medium, which may switch an established PDU Session to an appropriate NSI when a service priority of a user changes.

According to a first aspect, the embodiments of the present disclosure provide a method for adjusting a service priority of a user, including:

an AF sends service priority change information of UE to a PCF, wherein the UE has registered with a network and activated a PDU Session, and a network slice identifier (S-NSSAI, also referred to as Single-Network Slice Selection Assistance Information) registered by the UE in the network is a first S-NSSAI, and a Network Slice Instance (NSI) corresponding to the first S-NSSAI is an NSI corresponding to a normal service priority user;

the PCF notifies an SMF corresponding to the activated PDU Session to deactivate the PDU Session activated by the UE;

the SMF corresponding to the activated PDU Session deactivates the PDU Session activated by the UE, and notifies the UE to reestablish a PDU Session;

an AMF receives a PDU Session establishment request sent by the UE, wherein the PDU Session establishment request carries the first S-NSSAI;

the AMF sends a service authorization request message to the PCF, wherein the service authorization request message includes an identifier of the UE and the first S-NSSAI;

the PCF modifies the first S-NSSAI into a changed S-NSSAI corresponding to the service priority change information according to the service priority change information of the UE;

the PCF sends a service authorization response message to the AMF, wherein the service authorization response message includes the changed S-NSSAI;

the AMF sends a user slice information acquisition request message to an NSSF, wherein the user slice information acquisition request message includes the changed S-NSSAI;

the NSSF sends a user slice information acquisition response message to the AMF, wherein the user slice information acquisition response message carries NSI information corresponding to the changed S-NSSAI;

the AMF selects an SMF corresponding to an NSI corresponding to the changed S-NSSAI according to the changed S-NSSAI, the NSI information corresponding to the changed S-NSSAI and a DNN;

the AMF sends a create session context request message to the SMF corresponding to the NSI corresponding to the changed S-NSSAI, wherein the create session context request message carries the changed S-NSSAI;

the SMF corresponding to the NSI corresponding to the changed S-NSSAI sends a create session context response message to the AMF; and the SMF corresponding to the NSI corresponding to the changed S-NSSAI, and the AMF establish a new PDU Session for the UE, wherein an S-NSSAI of the new PDU Session is the changed S-NSSAI.

According to a second aspect, the embodiments of the present disclosure provide a system for adjusting a service priority of a user, including: an AF, a PCF, an SMF, an AMF, and an NSSF.

The AF is configured to send service priority change information of UE to a PCF, wherein the UE has registered with a network and activated a PDU Session, and a network slice identifier (S-NSSAI) registered by the UE in the network is a first S-NSSAI, and a Network Slice Instance (NSI) corresponding to the first S-NSSAI is an NSI corresponding to a normal service priority user.

The PCF is configured to notify the SMF corresponding to the activated PDU Session to deactivate the PDU Session activated by the UE.

The SMF corresponding to the activated PDU Session is configured to deactivate the PDU Session activated by the UE, and notify the UE to reestablish a PDU Session.

The AMF is configured to receive a PDU Session establishment request sent by the UE, wherein the PDU Session establishment request carries the first S-NSSAI; and send a service authorization request message to the PCF, wherein the service authorization request message includes an identifier of the UE and the first S-NSSAI.

The PCF is further configured to modify the first S-NSSAI into a changed S-NSSAI corresponding to the service priority change information according to the service priority change information of the UE, and send a service authorization response message to the AMF, wherein the service authorization response message includes the changed S-NSSAI.

The AMF is further configured to send a user slice information acquisition request message to an NSSF, wherein the user slice information acquisition request message includes the changed S-NSSAI.

The NSSF is configured to send a user slice information acquisition response message to the AMF, wherein the user slice information acquisition response message carries NSI information corresponding to the changed S-NSSAI.

The AMF is further configured to select an SMF corresponding to an NSI corresponding to the changed S-NSSAI according to the changed S-NSSAI, the NSI information corresponding to the changed S-NSSAI and a DNN, and send a create session context request message to the SMF corresponding to the NSI corresponding to the changed S-NSSAI, wherein the create session context request message carries the changed S-NSSAI.

The SMF corresponding to the NSI corresponding to the changed S-NSSAI is configured to send a create session context response message to the AMF.

The SMF corresponding to the NSI corresponding to the changed S-NSSAI, and the AMF are further configured to establish a new PDU Session for the UE, wherein S-NSSAI of the new PDU Session is the changed S-NSSAI.

According to a third aspect, the embodiments of the present disclosure provide a computer-readable storage medium, on which a computer program is stored, wherein when the program is executed by a processor, the method for adjusting a service priority of a user according to the first aspect is implemented.

DETAILED DESCRIPTION

Hereinafter, exemplary embodiments of the present disclosure will be described in detail in combination with accompanying drawings.

Currently, mobile communication has developed to the 5G stage. Compared with the previous several generations, the main feature of a 5G network architecture is a servitization-based architecture.

Figure 1:
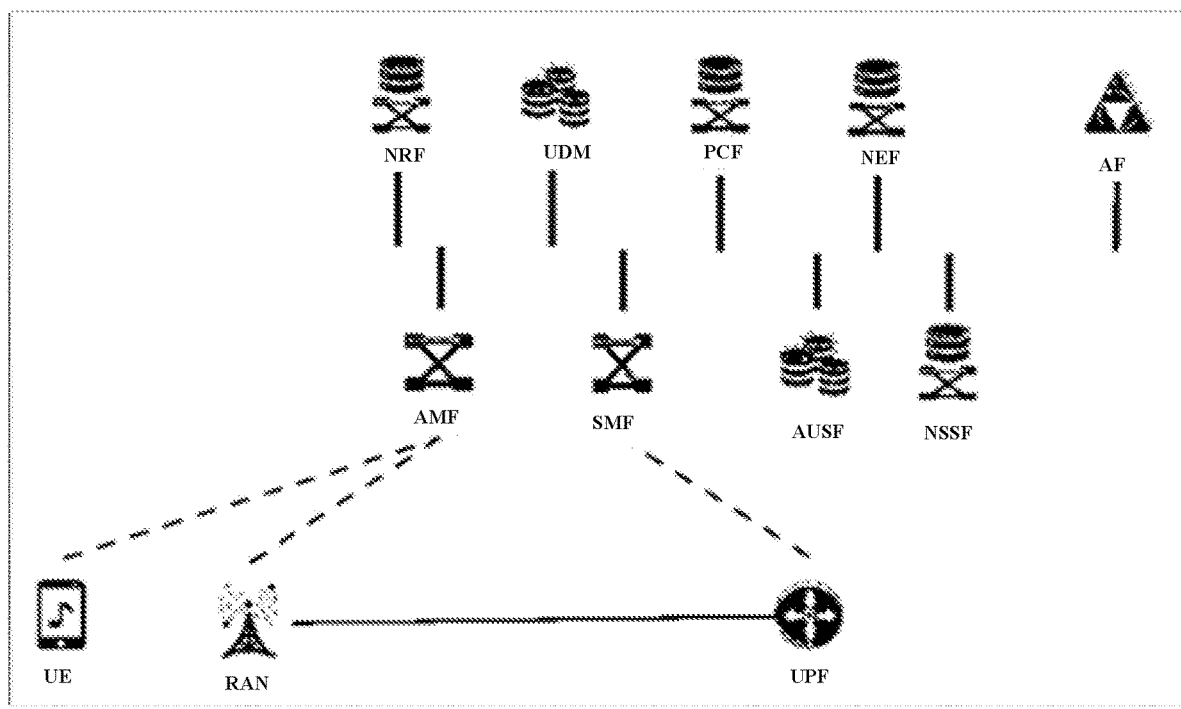
FIG. 1 is a schematic diagram of a 5G network architecture.

FIG. 1 is a schematic diagram of a 5G network architecture. As shown in FIG. 1, functions of network elements in the 5G network architecture are as follows.

User Equipment (UE) mainly accesses a 5G network via a radio air interface to obtain a service; and a terminal exchanges information with a base station via the air interface, and exchanges information with an Access and Mobility Management function (AMF) of a core network via Non-Access Stratum (NAS) signaling.

Radio Access Network (RAN) is responsible for air interface resource scheduling and air interface connection management of a terminal access network.

Access and Mobility Management function (AMF), as a control plane entity of the core network, is mainly responsible for user mobility management, including functions such as, registration and temporary identifier allocation; maintenance of an IDLE state and a CONNECT state and state transition; switching in the CONNECT state; and triggering paging in a user IDLE state, etc.

Authentication Server Function (AUSF), as a control plane entity of the core network, is mainly responsible for authentication and authorization of a user, so as to ensure that the user is a valid user.

Unified Data Management (UDM) function, as a control plane entity of the core network, belongs to a user server, and permanently stores user subscription data.

Session Management function (SMF), as a control plane entity of the core network, is mainly responsible for maintaining a PDU Session. The SMF is responsible for allocating an Internet Protocol (IP) address of a user, and has functions such as QoS control and charging functions, and functions of buffering, when receiving a downlink data packet in an IDLE state of the user, the downlink data packet and notifying an AMF to page the user, etc.

User plane function (UPF), as a user plane functional entity of the core network, is responsible for forwarding user data packets, and also performing statistical calculation on the user data packets for functions such as charging.

Policy Control Functionality (PCF), as a control plane entity of the core network, is a functional entity responsible for an access and mobility management policy, a UE policy, a session management policy and a charging rule. The functional entity mainly generates an access and mobility management policy, a UE route selection policy, a QoS rule of user data transfer and a charging rule, etc. according to service information, user subscription information and operator configuration information.

Network Exposure Function (NEF), as a control plane entity of the core network, is responsible for exposure of mobile network capabilities to the outside.

Network Function Repository Function (NF Repository Function, NRF), as a control plane entity of the core network, is responsible for dynamic registration of service capabilities of a network function and network function discovery.

Network Slice Selection Function (NSSF), as a control plane entity of the core network, is responsible for selection of a target NSI.

Application Function (AF), as an application entity, is responsible for providing specific services for a user.

The 5G network supports various scenarios, and different scenarios have different requirements on functions and performances of the network. A Network Slicing (NS) technology can enable an operator to slice, on the same set of hardware infrastructure, a plurality of virtual logical end-to-end networks according to requirements. Network slices are logically isolated from each other, and may adapt to different feature requirements of various types of services. For example, the network slices may simultaneously satisfy different requirements, for the network, of services requiring high QoS assurance and of services requiring general QoS assurance. After network slicing, in order to better use network resources, a dedicated Network Slice Instance (NSI) may be created in the network, so as to ensure a service of a high-priority user or a high-priority service.

Figure 2:
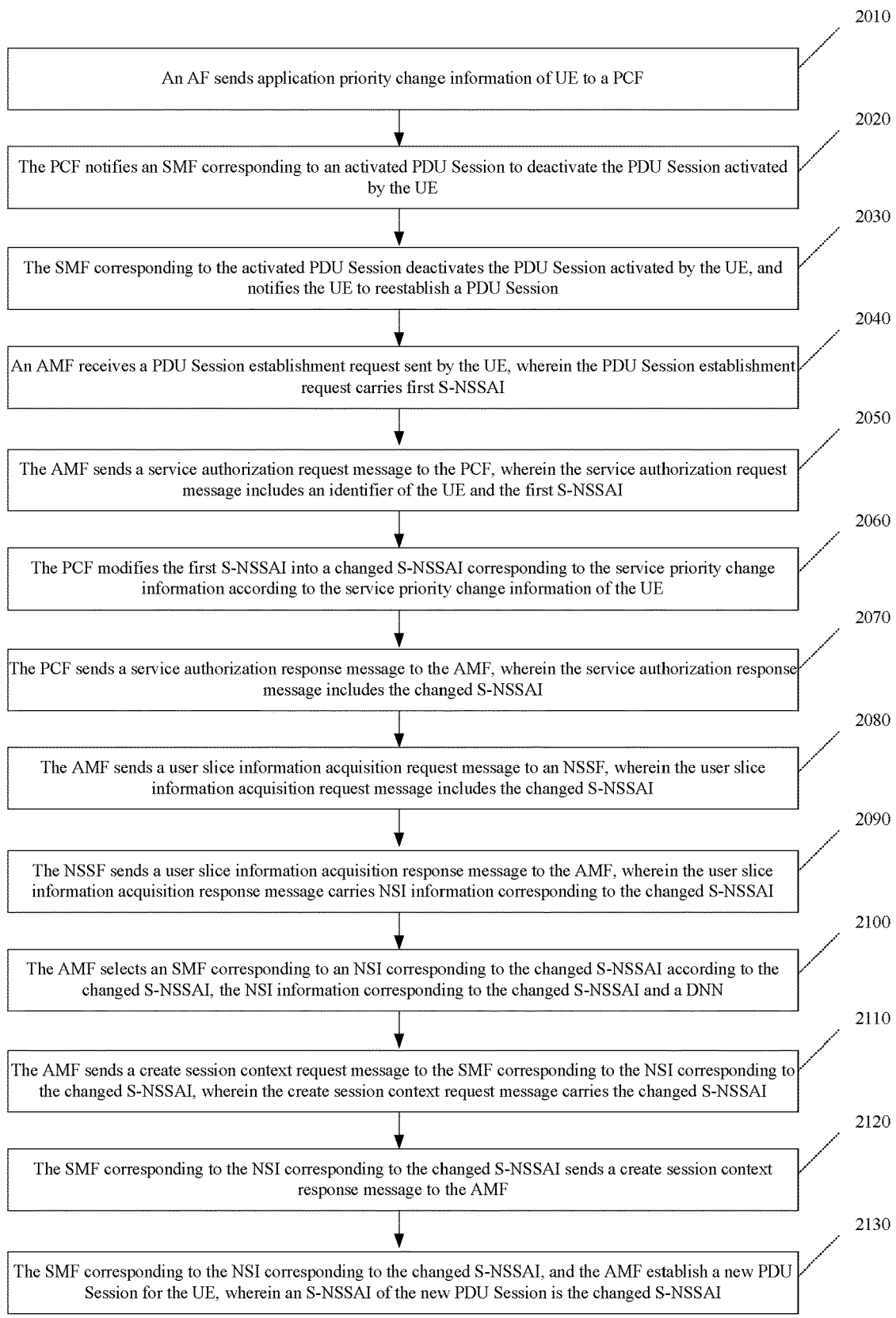
FIG. 2 is a flowchart of a method for adjusting a service priority of a user provided according to some exemplary embodiments.

FIG. 2 is a flowchart of a method for adjusting a service priority of a user provided according to some exemplary embodiments. As shown in FIG. 2, the method for adjusting a service priority of a user provided in this embodiment includes operations S2010 to S2130.

At S2010, an AF sends service priority change information of UE to a PCF, wherein the UE has registered with a network and activated a PDU Session, and an S-NSSAI registered by the UE in the network is a first S-NSSAI, and an NSI corresponding to the first S-NSSAI is an NSI corresponding to a normal service priority user.

The method for adjusting a service priority of a user provided in this embodiment is applied to a network side in a 5G network, and an architecture of the 5G network is as shown in FIG. 1, wherein network functions except the UE and the RAN are all deployed at the network side, and each network function may be a function deployed in an independent device or a function deployed in multiple network devices.

In the network, at least two different service priorities are set, and the different service priorities have different QoS. Corresponding NSIs are respectively created for different service priorities in the network. If a normal user subscribes to a short-term or long-term or other forms of VIP services by means of an APP or an SP website or other manners due to poor service QoS assurance and poor service experience, then the user is upgraded to a high-priority user, or some services used by the user are upgraded to high-priority services. In order to ensure service experiences of these high-priority users, it is necessary to switch PDU Sessions established by the users to dedicated NSIs, so as to improve the service QoS assurance level of the users. Alternatively, when a Very Important Person (VIP) service of a user who has subscribed to the VIP service expires or the user unsubscribes from the VIP service, it is necessary to switch a high-priority NSI used by the user to an NSI corresponding to a normal user.

First, when the AF determines that a service priority of the UE changes, the AF sends service priority change information of the UE to the PCF, wherein the UE has registered with a network and activated a PDU Session, and an S-NSSAI registered by the UE in the network is a first S-NSSAI, and an NSI corresponding to the first S-NSSAI is an NSI corresponding to a normal service priority user. That is to say, when the UE registered with the network, the first S-NSSAI corresponding to normal-priority UE is used.

After receiving high-priority service subscription information sent by the UE, the AF may send the high-priority service subscription information of the UE to the PCF, and at this time, an NSI corresponding to the PDU Session activated by the UE is an NSI used by a normal-priority user. That is to say, at this moment, the PDU Session activated by the UE is a first PDU Session, an NSI corresponding to the first PDU Session is a first NSI, and the first PDU Session and the first NSI correspond to the first S-NSSAI and correspond to the normal-priority user. The high-priority service subscription information is that when a user using the UE feels that the service experience is poor, the user subscribes to a short-term or long-term VIP service by a prompt on the APP so as to acquire better service experience, or for other reasons, the user subscribes to the VIP service via an APP client. Then the AF corresponding to the APP will receive the high-priority service subscription information sent by the UE.

After receiving high-priority service unsubscription information sent by the UE, the AF may also send the high-priority service subscription cancellation information to the PCF, and at this time, an NSI corresponding to the PDU Session activated by the UE is an NSI used by a high-priority user. That is to say, at this moment, the PDU Session activated by the UE is a second PDU Session, an NSI corresponding to the second PDU Session is a second NSI, and the second PDU Session and the second NSI correspond to a second S-NSSAI and correspond to the high-priority user. The high-priority service unsubscription information is sent actively when the user using the UE does not need to use the VIP service, or sent automatically when the VIP service subscribed by the UE expires.

When it is determined that a high-priority service subscribed by the UE expires and has not been renewed, the AF may also send high-priority service subscription cancellation information to the PCF, and at this time, an NSI corresponding to the PDU Session activated by the UE is an NSI used by a high-priority user. That is to say, at this moment, the PDU Session activated by the UE is a second PDU Session, an NSI corresponding to the second PDU Session is a second NSI, and the second PDU Session and the second NSI correspond to a second S-NSSAI and correspond to the high-priority user. The high-priority service unsubscription information is sent actively when the user using the UE does not need to use the VIP service, or sent automatically when the VIP service subscribed by the UE expires.

The AF may send the service priority change information of the UE to the PCF via an NEF, or the AF may directly send the service priority change information of the UE to the PCF.

At S2020, the PCF notifies an SMF corresponding to the activated PDU Session to deactivate the PDU Session activated by the UE.

After receiving the service priority change information sent by the AF, the PCF learns that the service priority of the UE has changed, and at this time, the PCF notifies an SMF corresponding to the PDU Session activated by the UE to deactivate the PDU Session activated by the UE.

Before the PCF notifies an SMF corresponding to the activated PDU Session to deactivate the PDU Session activated by the UE, the PCF may further subscribe with the AMF for service authorization of the UE.

At S2030, the SMF corresponding to the activated PDU Session deactivates the PDU Session activated by the UE, and notifies the UE to reestablish a PDU Session.

After receiving a notification of deactivating the PDU Session sent by the PCF, the SMF corresponding to the PDU Session activated by the UE deactivates the PDU Session activated by the UE, and notifies the UE to reestablish a PDU Session. The service priority of the UE changes, and thus the PDU Session activated by the UE cannot satisfy QoS requirement of the UE; therefore, the UE needs to reestablish a PDU Session, and the PDU Session reestablished by the UE corresponds to the changed priority of the UE.

At S2040, the AMF receives a PDU Session establishment request sent by the UE, wherein the PDU Session establishment request carries the first S-NSSAI.

The PDU Session establishment request sent by the UE is received by the AMF, and since S-NSSAI used when the UE registered with the network is the first S-NSSAI, the PDU Session establishment request sent by the UE carries the first S-NSSAI.

At S2050, the AMF sends a service authorization request message to the PCF, wherein the service authorization request message includes an identifier of the UE and the first S-NSSAI.

After receiving the PDU Session establishment request, the AMF sends the service authorization request message to the PCF, wherein the service authorization request message includes an identifier of the UE and the first S-NSSAI. The identifier of the UE may be a Subscription Permanent Identifier (SUPI).

At S2060, the PCF modifies the first S-NSSAI into a changed S-NSSAI corresponding to the service priority change information according to the service priority change information of the UE.

As the PCF has received the service priority change information of the UE sent by the AF, the PCF has learned that the service priority of the UE has changed. Then, after receiving the service authorization request message sent by the AMF, the PCF first determines information of the UE according to the identifier of the UE, and determines that the UE is UE of which the service priority has changed. Subsequently, the PCF modifies the first S-NSSAI corresponding to the UE into a changed S-NSSAI corresponding to the service priority change information. The changed S-NSSAI may be the same as or different from the first S-NSSAI.

At S2070, the PCF sends a service authorization response message to the AMF, wherein the service authorization response message includes the changed S-NSSAI.

After the PCF modifies the first S-NSSAI into the changed S-NSSAI, the PCF sends the service authorization response message to the AMF, wherein the service authorization response message includes the changed S-NSSAI;

At S2080, the AMF sends a user slice information acquisition request message to a Network Slice Selection Function (NSSF), wherein the user slice information acquisition request message includes the changed S-NSSAI.

After receiving the service authorization response message, the AMF may establish a new PDU Session for the UE according to the changed S-NSSAI carried in the service authorization response message. The AMF first sends the user slice information acquisition request message to the NSSF, wherein the user slice information acquisition request message includes the changed S-NSSAI.

At S2090, the NSSF sends a user slice information acquisition response message to the AMF, wherein the user slice information acquisition response message carries NSI information corresponding to the changed S-NSSAI.

After receiving the user slice information response message sent by the AMF, the NSSF allocates a corresponding NSI to the changed S-NSSAI, and then sends the NSI information corresponding to the changed S-NSSAI to the AMF.

At S2100, the AMF selects an SMF corresponding to an NSI corresponding to the changed S-NSSAI according to the changed S-NSSAI, the NSI information corresponding to the changed S-NSSAI and a DNN.

At S2110, the AMF sends a create session context request message to the SMF corresponding to the NSI corresponding to the changed S-NSSAI, wherein the create session context request message carries the changed S-NSSAI.

In some exemplary embodiments, in the create session context request message sent by the AMF to the SMF corresponding to the NSI corresponding to the changed S-NSSAI, the first S-NSSAI is further included. The first S-NSSAI is used for subscription checking, that is, the SMF corresponding to the NSI corresponding to the changed S-NSSAI acquires subscription data of the UE from UDM.

At S2120, the SMF corresponding to the NSI corresponding to the changed S-NSSAI sends a create session context response message to the AMF.

At S2130, the SMF corresponding to the NSI corresponding to the changed S-NSSAI, and the AMF establish a new PDU Session for the UE, wherein an S-NSSAI of the new PDU Session is the changed S-NSSAI.

The operation S2130 may include: when the SMF selects the PCF and acquires a Session Management Policy (SM Policy) from the PCF, the SMF provides the changed S-NSSAI to the PCF; and the SMF selects a UPF, and completes N4 session creation to the UPF. The SMF constructs an N2 PDU Session request message, wherein the message carries the changed S-NSSAI; and the SMF constructs a PDU Session establishment acceptance message. The SMF sends an N1N2 message transfer message to the AMF, wherein the message carries the N2 PDU Session request message and the PDU Session establishment acceptance message. The AMF sends the N2 PDU Session request message to the RAN, wherein the message includes the PDU Session establishment acceptance message. The RAN sends the PDU Session establishment acceptance message to the UE. The RAN returns an N2 PDU Session response message to the AMF. The AMF sends an update session context request message to the SMF, wherein the message carries the N2 PDU Session response message. The SMF updates an N4 session. The SMF returns an update session context response message to the AMF. Finally, the UE accesses a service by means of the NSI corresponding to the changed S-NSSAI.

The method for adjusting a service priority of a user provided in this embodiment solves the problem of how to switch an established PDU Session to an appropriate NSI when a priority of a UE or a service priority of a user changes. By means of the method of the present embodiment, when a priority of a user or a service priority of a user changes, an established PDU Session may be switched to an appropriate NSI, so that the service experience of a high-priority user or of a high-priority service of a user is better ensured.

Figure 3:
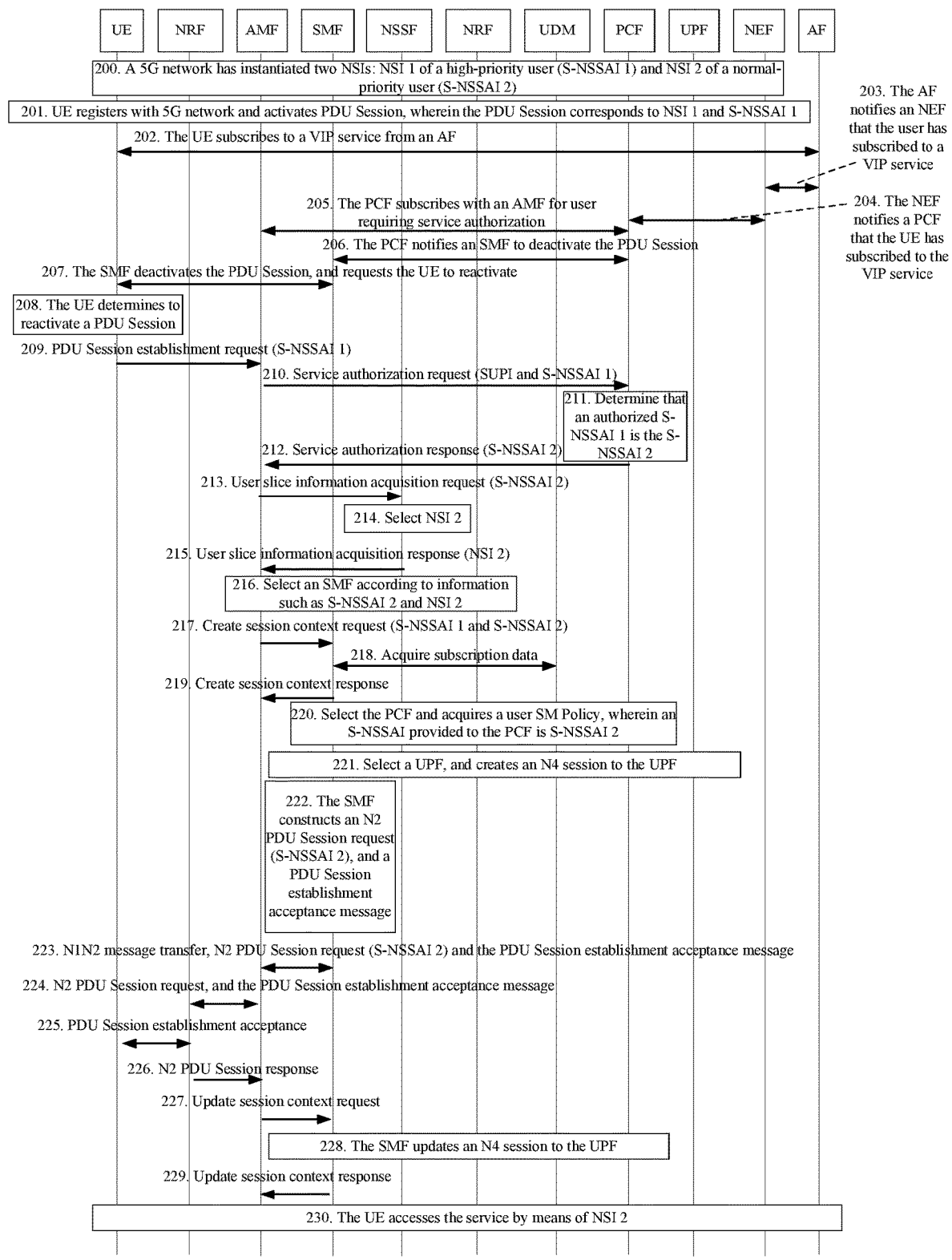
FIG. 3 is a flowchart of exemplary implementation of a method for adjusting a service priority of a user provided according to some exemplary embodiments.

FIG. 3 is an implementation flowchart of a method for adjusting a service priority of a user provided according to some exemplary embodiments. This embodiment is an embodiment in which UE subscribes to a VIP service, and an AF notifies a 5G network via an NEF. As shown in FIG. 3, the method for adjusting a service priority of a user provided in this embodiment includes operations 200 to 230.

At 200, for a certain service, a 5G network has instantiated two NSIs: NSI1 and NSI2. NSI1 refers to a normal user using the service, and a corresponding S-NSSAI is S-NSSAI1. NSI2 refers to a high-priority user using the service, and a corresponding S-NSSAI is S-NSSAI2.

At 201, UE registers with the 5G network and activates a PDU Session, an S-NSSAI of the activated PDU Session is the S-NSSAI1, and the PDU Session corresponds to the NSI1.

At 202, if a user feels that the service experience is poor, or an APP prompts that a short-term or long-term VIP service may be subscribed to acquire a better service experience, or for other reasons, the user subscribes to the VIP service via an APP client.

At 203, an AF notifies an NEF that the user has subscribed to the VIP service.

At 204, the NEF notifies a PCF that the user has subscribed to the VIP service.

At 205, the PCF subscribes with an AMF for a user requiring service authorization, wherein the user is the user who has subscribed to the VIP service.

At 206, the PCF notifies an SMF to deactivate the established PDU Session which is affected.

At 207, the SMF completes a flow of deactivating the established PDU Session, and requests the UE to reestablish a PDU Session when deactivating the established PDU Session.

At 208, the UE determines to re-initiate a PDU Session, and determines that information such as S-NSSAI used by the PDU Session is consistent with the previously deactivated PDU Session, i.e. S-NSSAI1.

At 209, the UE sends a PDU Session establishment request message carrying information such as the S-NSSAI1.

At 210, after receiving the PDU Session establishment request message, the AMF sends, to the PCF, a service authorization request message carrying information such as SUPI and the S-NSSAI1.

At 211, the PCF determines that S-NSSAI used by the service is S-NSSAI2 according to a priority of the user.

At 212, the PCF returns a service authorization response message to the AMF, and returns modified S-NSSAI2.

At 213, the AMF sends, to an NSSF, a user slice information acquisition request message carrying information such as the S-NSSAI2.

At 214, the NSSF selects information such as the NSI2 for the PDU Session according to information such as the S-NSSAI2.

At 215, the NSSF returns, to the AMF, a user slice information acquisition response message carrying information such as the NSI2.

At 216, the AMF selects an SMF according to information such as the S-NSSAI2, a DNN, and the NSI2.

At 217, the AMF sends a create session context request message to the SMF, the message carrying information such as a requested S-NSSAI and an authorized S-NSSAI, wherein the requested S-NSSAI is the S-NSSAI1, and the authorized S-NSSAI is the S-NSSAI2.

At 218, the SMF acquires subscription data from UDM.

At 219, the SMF returns a create session context response message to the AMF.

At 220, when the SMF selects the PCF and acquires a Session Management Policy (SM Policy) from the PCF, the SMF provides the S-NSSAI2 to the PCF.

At 221, the SMF selects a UPF, and completes N4 session creation to the UPF.

At 222, the SMF constructs an N2 PDU Session request message, the message carrying the S-NSSAI2; and the SMF constructs a PDU Session establishment acceptance message.

At 223, the SMF sends an N1N2 message transfer message to the AMF, wherein the message carries the N2 PDU Session request message and the PDU Session establishment acceptance message.

At 224, the AMF sends the N2 PDU Session request message to an RAN, wherein the message includes the PDU Session establishment acceptance message.

At 225, the RAN sends the PDU Session establishment acceptance message to the UE.

At 226, the RAN returns an N2 PDU Session response message to the AMF.

At 227, the AMF sends an update session context request message to the SMF, wherein the message carries the N2 PDU Session response message.

At 228, the SMF updates an N4 session.

At 229, the SMF returns an update session context response message to the AMF.

At 230, the UE accesses the service by means of the NSI2.

Figure 4:
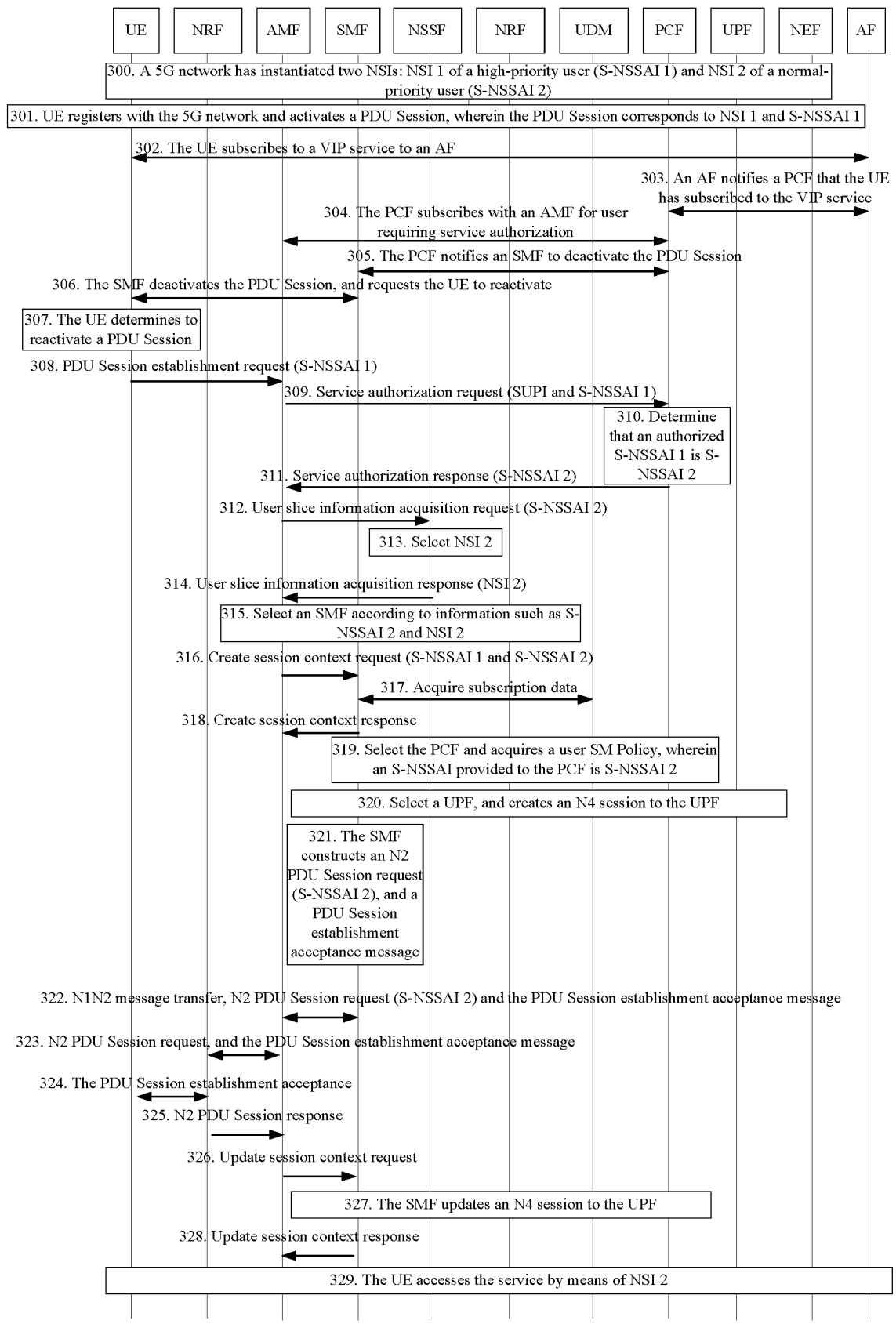
FIG. 4 is a flowchart of exemplary implementation of another method for adjusting a service priority of a user provided according to some exemplary embodiments.

FIG. 4 is an implementation flowchart of another method for adjusting a service priority of a user provided according to some exemplary embodiments. This embodiment is an exemplary embodiment in which UE subscribes to a VIP service, and an AF directly notifies a PCF. As shown in FIG. 4, the method for adjusting a service priority of a user provided in this embodiment includes operations 300 to 329.

At 300, for a certain service, a 5G network has instantiated two NSIs: NSI1 and NSI2. NSI1 refers to a normal user using the service, and a corresponding S-NSSAI is S-NSSAI1. NSI2 refers to a high-priority user using the service, and a corresponding S-NSSAI is S-NSSAI2.

At 301, UE registers with the 5G network and activates a PDU Session, an S-NSSAI of the activated PDU Session is the S-NSSAI1, and the PDU Session corresponds to the NSI1.

At 302, if a user feels that the service experience is poor, or an APP prompts that a short-term or long-term VIP service may be subscribed to acquire a better service experience, or for other reasons, the user subscribes to the VIP service via an APP client.

At 303, an AF notifies a PCF that the user has subscribed to the VIP service.

At 304, the PCF subscribes with an AMF for a user requiring service authorization, wherein the user is the user who has subscribed to the VIP service.

At 305, the PCF notifies an SMF to deactivate the established PDU Session which is affected.

At 306, the SMF completes a flow of deactivating the established PDU Session, and requests the UE to reestablish a PDU Session when deactivating the established PDU Session.

At 307, the UE determines to re-initiate a PDU Session, and determines that information such as S-NSSAI used by the PDU Session is consistent with the previously deactivated PDU Session, i.e. S-NSSAI1.

At 308, the UE sends a PDU Session establishment request message carrying information such as the S-NSSAI1.

At 309, after receiving the PDU Session establishment request message, the AMF sends, to the PCF, a service authorization request message carrying information such as SUPI and the S-NSSAI1.

At 310, the PCF determines that an S-NSSAI used by the service is S-NSSAI2 according to a priority of the user.

At 311, the PCF returns a service authorization response message to the AMF, and returns modified S-NSSAI2.

At 312, the AMF sends, to an NSSF, a user slice information acquisition request message carrying information such as the S-NSSAI2.

At 313, the NSSF selects information such as the NSI2 for the PDU Session according to information such as the S-NSSAI2.

At 314, the NSSF returns, to the AMF, a user slice information acquisition response message carrying information such as the NSI2.

At 315, the AMF selects an SMF according to information such as the S-NSSAI2, a DNN, and the NSI2.

At 316, the AMF sends a create session context request message to the SMF, the message carrying information such as a requested S-NSSAI and an authorized S-NSSAI, wherein the requested S-NSSAI is the S-NSSAI1, and the authorized S-NSSAI is the S-NSSAI2.

At 317, the SMF acquires subscription data from UDM.

At 318, the SMF returns a create session context response message to the AMF.

At 319, when the SMF selects the PCF and acquires a Session Management Policy (SM Policy) from the PCF, the SMF provides the S-NSSAI2 to the PCF.

At 320, the SMF selects a UPF, and completes N4 session creation to the UPF.

At 321, the SMF constructs an N2 PDU Session request message, the message carrying the S-NSSAI2; and the SMF constructs a PDU Session establishment acceptance message.

At 322, the SMF sends an N1N2 message transfer message to the AMF, wherein the message carries the N2 PDU Session request message and the PDU Session establishment acceptance message.

At 323, the AMF sends the N2 PDU Session request message to an RAN, wherein the message includes the PDU Session establishment acceptance message.

At 324, the RAN sends the PDU Session establishment acceptance message to the UE.

At 325, the RAN returns an N2 PDU Session response message to the AMF.

At 326, the AMF sends an update session context request message to the SMF, wherein the message carries the N2 PDU Session response message.

At 327, the SMF updates an N4 session.

At 328, the SMF returns an update session context response message to the AMF.

At 329, the UE accesses the service by means of the NSI2.

Figure 5:
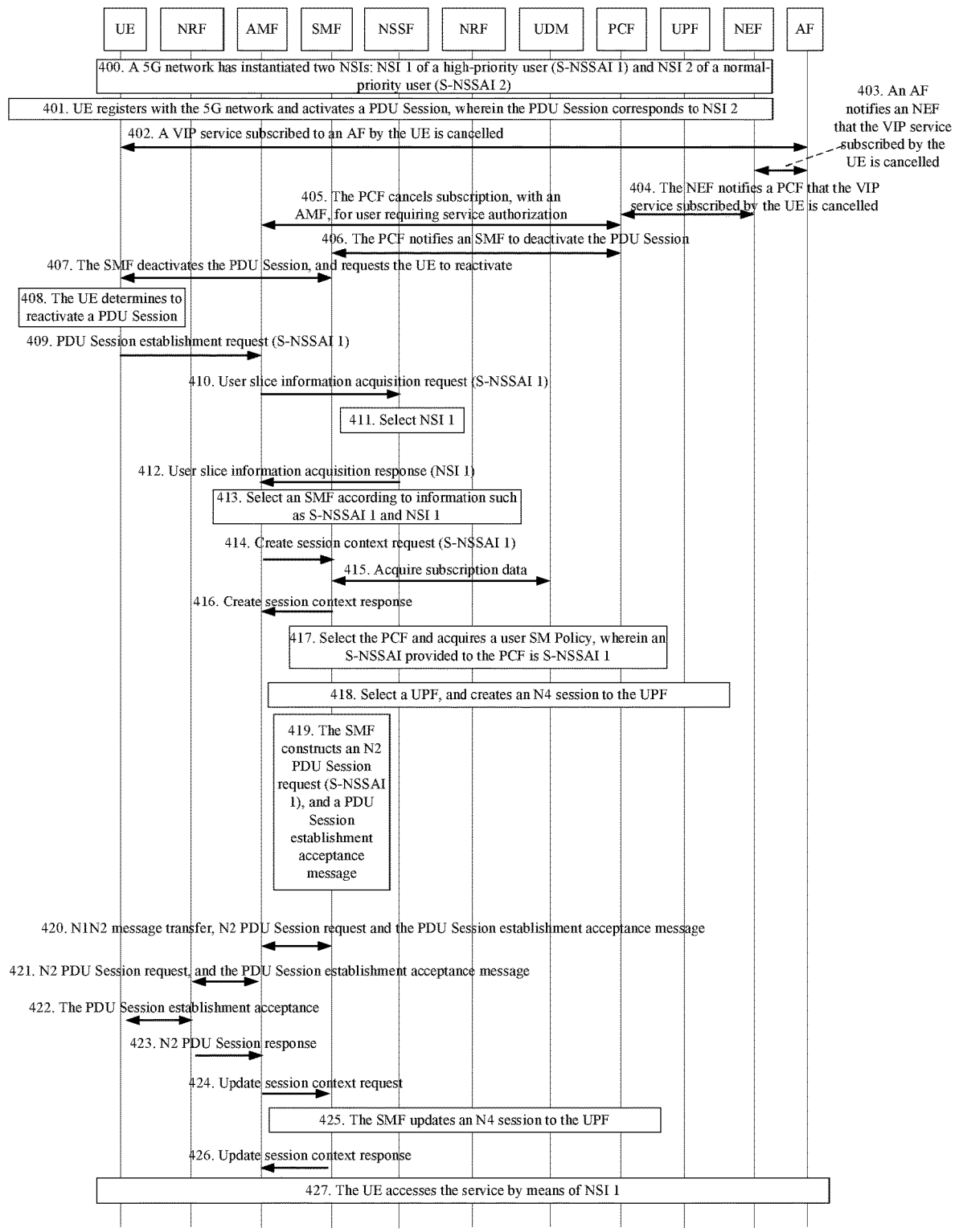
FIG. 5 is a flowchart of exemplary implementation of another method for adjusting a service priority of a user provided according to some exemplary embodiments.

FIG. 5 is an implementation flowchart of another method for adjusting a service priority of a user provided according to some exemplary embodiments. This embodiment is an exemplary embodiment in which a VIP service subscribed by UE expires, and an AF notifies a 5G network via an NEF. As shown in FIG. 5, the method for adjusting a service priority of a user provided in this embodiment includes operations 400 to 430.

At 400, for a certain service, a 5G network has instantiated two NSIs: NSI1 and NSI2. NSI1 refers to a normal user using the service, and a corresponding S-NSSAI is S-NSSAI1. NSI2 refers to a high-priority user using the service, and a corresponding S-NSSAI is S-NSSAI2.

At 401, UE registers with a 5G network and activates a PDU Session, wherein the PDU Session corresponds to the NSI2.

At 402, a VIP service previously subscribed by the user expires without renewal.

At 403, an AF notifies an NEF that the user has cancelled the subscribed VIP service.

At 404, the NEF notifies a PCF that the user has cancelled the subscribed VIP service.

At 405, the PCF subscribes with an AMF for a user requiring service authorization, wherein the user is the user who has subscribed to the VIP service.

At 406, the PCF notifies an SMF to deactivate the established PDU Session which is affected.

At 407, the SMF completes a flow of deactivating the established PDU Session, and requests the UE to reestablish a PDU Session when deactivating the established PDU Session.

At 408, the UE determines to re-initiate a PDU Session, and determines that information such as S-NSSAI used by the PDU Session is consistent with the previously deactivated PDU Session, i.e. S-NSSAI1.

At 409, the UE sends a PDU Session establishment request message carrying information such as the S-NSSAI1.

At 410, after receiving the PDU Session establishment request message, the AMF sends, to the PCF, a service authorization request message carrying information such as SUPI and the S-NSSAI1.

At 411, the PCF determines that an S-NSSAI used by the service is S-NSSAI1 according to a priority of the user.

At 412, the PCF returns a service authorization response message to the AMF, and returns a modified S-NSSAI1.

At 413, the AMF sends, to an NSSF, a user slice information acquisition request message carrying information such as the S-NSSAI1.

At 414, the NSSF selects information such as the NSI1 for the PDU Session according to information such as the S-NSSAI1.

At 415, the NSSF returns, to the AMF, a user slice information acquisition response message carrying information such as the NSI1.

At 416, the AMF selects an SMF according to information such as the S-NSSAI1, a DNN, and the NSI1.

At 417, the AMF sends a create session context request message to the SMF, the message carrying information such as a requested S-NSSAI, wherein the requested S-NSSAI is the S-NSSAI1.

At 418, the SMF acquires subscription data from UDM.

At 419, the SMF returns a create session context response message to the AMF.

At 420, when the SMF selects the PCF and acquires a Session Management Policy (SM Policy) from the PCF, the SMF provides the S-NSSAI1 to the PCF.

At 421, the SMF selects a UPF, and completes N4 session creation to the UPF.

At 422, the SMF constructs an N2 PDU Session request message, the message carrying the S-NSSAI1; and the SMF constructs a PDU Session establishment acceptance message.

At 423, the SMF sends an N1N2 message transfer message to the AMF, wherein the message carries the N2 PDU Session request message and the PDU Session establishment acceptance message.

At 424, the AMF sends the N2 PDU Session request message to an RAN, wherein the message includes the PDU Session establishment acceptance message.

At 425, the RAN sends the PDU Session establishment acceptance message to the UE.

At 426, the RAN returns an N2 PDU Session response message to the AMF.

At 427, the AMF sends an update session context request message to the SMF, wherein the message carries the N2 PDU Session response message.

At 428, the SMF updates an N4 session.

At 429, the SMF returns an update session context response message to the AMF.

At 430, the UE accesses the service by means of the NSI1.

Figure 6:
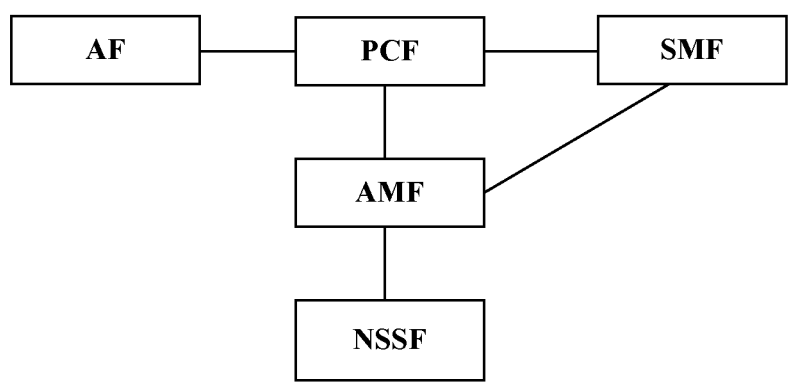
FIG. 6 is a schematic structural diagram of a system for adjusting a service priority of a user provided according to some exemplary embodiments.

FIG. 6 is a schematic structural diagram of a system for adjusting a service priority of a user provided according to some exemplary embodiments. As shown in FIG. 6, the system for adjusting a service priority of a user provided in this embodiment includes: an AF, a PCF, an SMF, an AMF, and an NSSF.

The AF is configured to send service priority change information of UE to a PCF, wherein the UE has registered with a network and activated a PDU Session, and an S-NSSAI registered by the UE in the network is a first S-NSSAI, and an NSI corresponding to the first S-NSSAI is an NSI corresponding to a normal service priority user. The PCF is configured to notify an SMF corresponding to the activated PDU Session to deactivate the PDU Session activated by the UE. The SMF corresponding to the activated PDU Session is configured to deactivate the PDU Session activated by the UE, and notify the UE to reestablish a PDU Session. The AMF is configured to receive a PDU Session establishment request sent by the UE, wherein the PDU Session establishment request carries the first S-NSSAI; and send a service authorization request message to the PCF, wherein the service authorization request message includes an identifier of the UE and the first S-NSSAI. The PCF is further configured to modify the first S-NSSAI into a changed S-NSSAI corresponding to the service priority change information according to the service priority change information of the UE, and send a service authorization response message to the AMF, wherein the service authorization response message includes the changed S-NSSAI. The AMF is further configured to send a user slice information acquisition request message to an NSSF, wherein the user slice information acquisition request message includes the changed S-NSSAI. The NSSF is configured to send a user slice information acquisition response message to the AMF, wherein the user slice information acquisition response message carries NSI information corresponding to the changed S-NSSAI. The AMF is further configured to select an SMF corresponding to an NSI corresponding to the changed S-NSSAI according to the changed S-NSSAI, the NSI information corresponding to the changed S-NSSAI and a DNN, and send a create session context request message to the SMF corresponding to the NSI corresponding to the changed S-NSSAI, wherein the create session context request message carries the changed S-NSSAI. The SMF corresponding to the NSI corresponding to the changed S-NSSAI is configured to send a create session context response message to the AMF. The SMF corresponding to the NSI corresponding to the changed S-NSSAI, and the AMF are further configured to establish a new PDU Session for the UE, wherein S-NSSAI of the new PDU Session is the changed S-NSSAI.

The system for adjusting a service priority of a user provided in this embodiment is used to implement the technical solution of the method for adjusting a service priority of a user as shown in FIG. 2, and the implementation principles and technical effects are similar, and thus will not be described herein again.

On the basis of the exemplary embodiment as shown in FIG. 6, the PCF is further configured to subscribe with the AMF for service authorization of the UE before notifying the SMF corresponding to the activated PDU Session to deactivate the PDU Session activated by the UE.

On the basis of the exemplary embodiment as shown in FIG. 6, the AF is configured to send the service priority change information of the UE to the PCF via a Network Exposure Function (NEF).

On the basis of the exemplary embodiment as shown in FIG. 6, the AF is further configured to receive and acquire high-priority service subscription information sent by the UE; and send the high-priority service subscription information of the UE to the PCF, wherein an NSI corresponding to the PDU Session activated by the UE is an NSI used by a normal-priority user, and an NSI corresponding to the new PDU Session is an NSI used by a high-priority user.

On the basis of the exemplary embodiment as shown in FIG. 6, the AF is configured to send high-priority service subscription cancellation information of the UE to the PCF in a case of determining that a high-priority service subscribed by the UE expires and has not been renewed or in a case of receiving high-priority service unsubscription information sent by the UE, wherein an NSI corresponding to the PDU Session activated by the UE is an NSI used by a high-priority user, and an NSI corresponding to the new PDU Session is an NSI used by a normal-priority user.

On the basis of the exemplary embodiment as shown in FIG. 6, the create session context request message further carries the first S-NSSAI, and the first S-NSSAI is used for subscription check.

Embodiments of the present disclosure further provide a storage medium containing computer-executable instructions; the computer-executable instructions, when executed by a processor of a computer, are used for executing a method for adjusting a service priority of a user. The method includes: an AF sends service priority change information of UE to a PCF, wherein the UE has registered with a network and activated a PDU Session, and an S-NSSAI registered by the UE in the network is a first S-NSSAI, and an NSI corresponding to the first S-NSSAI is an NSI corresponding to a normal service priority user; the PCF notifies an SMF corresponding to the activated PDU Session to deactivate the PDU Session activated by the UE; the SMF corresponding to the activated PDU Session deactivates the PDU Session activated by the UE, and notifies the UE to reestablish a PDU Session; an AMF receives a PDU Session establishment request sent by the UE, wherein the PDU Session establishment request carries the first S-NSSAI; the AMF sends a service authorization request message to the PCF, wherein the service authorization request message includes an identifier of the UE and the first S-NSSAI; the PCF modifies the first S-NSSAI into a changed S-NSSAI corresponding to the service priority change information according to the service priority change information of the UE; the PCF sends a service authorization response message to the AMF, wherein the service authorization response message includes the changed S-NSSAI; the AMF sends a user slice information acquisition request message to an NSSF, wherein the user slice information acquisition request message includes the changed S-NSSAI; the NSSF sends a user slice information acquisition response message to the AMF, wherein the user slice information acquisition response message carries NSI information corresponding to the changed S-NSSAI; the AMF selects an SMF corresponding to an NSI corresponding to the changed S-NSSAI according to the changed S-NSSAI, the NSI information corresponding to the changed S-NSSAI and a DNN; the AMF sends a create session context request message to the SMF corresponding to the NSI corresponding to the changed S-NSSAI, wherein the create session context request message carries the changed S-NSSAI; the SMF corresponding to the NSI corresponding to the changed S-NSSAI sends a create session context response message to the AMF; and the SMF corresponding to the NSI corresponding to the changed S-NSSAI, and the AMF establish a new PDU Session for the UE, wherein S-NSSAI of the new PDU Session is the changed S-NSSAI.

The content above merely relates to exemplary embodiments of the present disclosure, and is not intended to limit the scope of protection of the present disclosure.

A person having ordinary skill in the art would understand that the term user terminal encompasses any suitable type of wireless user equipment, such as a mobile phone, a portable data processing apparatus, a portable web browser, or an in-vehicle mobile station.

In general, the multiple embodiments of the present disclosure may be implemented in hardware or dedicated circuit, software, logic, or any combination thereof. For example, some aspects may be implemented in hardware, while other aspects may be implemented in firmware or software that may be executed by a controller, a microprocessor or other computing devices, although the present disclosure is not limited thereto.

Embodiments of the present disclosure may be implemented by execution of computer program instructions by a data processor of a mobile apparatus, such as in a processor entity, or by hardware, or by a combination of software and hardware. The computer program instructions may be assembly instructions, Instruction Set Architecture (ISA) instructions, machine instructions, machine-related instructions, microcodes, firmware instructions, state setting data, or source codes or object codes written in any combination of one or more programming languages.

The block diagrams of any logic flow in the accompanying drawings of the present disclosure may represent program operations, or may represent interconnected logic circuits, modules and functions, or may represent a combination of program operations and logic circuits, modules, and functions. A computer program may be stored on a memory. The memory may be of any type suitable for local technical environment and may be implemented using any suitable data storage technology, such as, but not limited to, Read-Only Memory (ROM), Random Access Memory (RAM), optical storage apparatus and system (Digital Video Disc (DVD) or Compact Disc (CD)), etc. A computer-readable medium may include a non-transitory storage medium. The data processor may be of any type suitable for local technical environment, such as, but not limited to, a general-purpose computer, a special-purpose computer, a microprocessor, a Digital Signal Processor (DSP), an Application Specific Integrated Circuit (ASIC), a programmable logic device (Field-Programmable Gate Array, FGPA), and a processor based on a multi-core processor architecture.

INDUSTRIAL APPLICABILITY

In the present disclosure, by a method in which an Application Function (AF) sends service priority change information of User Equipment (UE) to a Policy Control Functionality (PCF), wherein the UE has registered with a network and activated a Packet Data Unit Session (PDU Session), and a network slice identifier (S-NSSAI) registered by the UE in the network is a first S-NSSAI, and an NSI corresponding to the first S-NSSAI is an NSI corresponding to a normal service priority user; the PCF notifies a Session Management function (SMF) corresponding to the activated PDU Session to deactivate the PDU Session activated by the UE; the SMF corresponding to the activated PDU Session deactivates the PDU Session activated by the UE, and notifies the UE to reestablish a PDU Session; an Access and Mobility Management function (AMF) receives a PDU Session establishment request sent by the UE, wherein the PDU Session establishment request carries the first S-NSSAI; the AMF sends a service authorization request message to the PCF, wherein the service authorization request message includes an identifier of the UE and the first S-NSSAI; the PCF modifies the first S-NSSAI into a changed S-NSSAI corresponding to the service priority change information according to the service priority change information of the UE; the PCF sends a service authorization response message to the AMF, wherein the service authorization response message includes the changed S-NSSAI; the AMF sends a user slice information acquisition request message to a Network Slice Selection Function (NSSF), wherein the user slice information acquisition request message includes the changed S-NSSAI; the NSSF sends a user slice information acquisition response message to the AMF, wherein the user slice information acquisition response message carries NSI information corresponding to the changed S-NSSAI; the AMF selects an SMF corresponding to an NSI corresponding to the changed S-NSSAI according to the changed S-NSSAI, the NSI information corresponding to the changed S-NSSAI and a data network name (DNN); the AMF sends a create session context request message to the SMF corresponding to the NSI corresponding to the changed S-NSSAI, wherein the create session context request message carries the changed S-NSSAI; the SMF corresponding to the NSI corresponding to the changed S-NSSAI sends a create session context response message to the AMF; and the SMF corresponding to the NSI corresponding to the changed S-NSSAI, and the AMF establish a new PDU Session for the UE, wherein S-NSSAI of the new PDU Session is the changed S-NSSAI, the problem of how to switch an established PDU Session to an appropriate NSI when a priority of a UE or a service priority of a user changes is solved, and when a priority of a user or a service priority of a user changes, an established PDU Session may be switched to an appropriate NSI, so that the service experience of a high-priority user or of a high-priority service of a user is better ensured.

What is claimed is:

1. A method for adjusting a service priority of a user, comprising:
    sending, by an Application Function (AF), service priority change information of User Equipment (UE) to a Policy Control Functionality (PCF), wherein the UE has registered with a network and activated a Packet Data Unit Session (PDU Session), and a network slice identifier (S-NSSAI) registered by the UE in the network is a first S-NSSAI, and a Network Slice Instance (NSI) corresponding to the first S-NSSAI is an NSI corresponding to a normal service priority user;
    notifying, by the PCF, a Session Management function (SMF) corresponding to the activated PDU Session to deactivate the PDU Session activated by the UE;
    deactivating, by the SMF corresponding to the activated PDU Session, the PDU Session activated by the UE, and notifying, by the SMF corresponding to the activated PDU Session, the UE to reestablish a PDU Session;
    receiving, by an Access and Mobility Management function (AMF), a PDU Session establishment request sent by the UE, wherein the PDU Session establishment request carries the first S-NSSAI;
    sending, by the AMF, a service authorization request message to the PCF, wherein the service authorization request message comprises an identifier of the UE and the first S-NSSAI;

modifying, by the PCF, the first S-NSSAI into a changed S-NSSAI corresponding to the service priority change information according to the service priority change information of the UE;

sending, by the PCF, a service authorization response message to the AMF, wherein the service authorization response message comprises the changed S-NSSAI;

sending, by the AMF, a user slice information acquisition request message to a Network Slice Selection Function (NSSF), wherein the user slice information acquisition request message comprises the changed S-NSSAI;

sending, by the NSSF, a user slice information acquisition response message to the AMF, wherein the user slice information acquisition response message carries NSI information corresponding to the changed S-NSSAI;

selecting, by the AMF, an SMF corresponding to an NSI corresponding to the changed S-NSSAI according to the changed S-NSSAI, the NSI information corresponding to the changed S-NSSAI and a data network name (DNN);

sending, by the AMF, a create session context request message to the SMF corresponding to the NSI corresponding to the changed S-NSSAI, wherein the create session context request message carries the changed S-NSSAI;

sending, by the SMF corresponding to the NSI corresponding to the changed S-NSSAI, a create session context response message to the AMF; and establishing, by the SMF corresponding to the NSI corresponding to the changed S-NSSAI, and the AMF, a new PDU Session for the UE, wherein an S-NSSAI of the new PDU Session is the changed S-NSSAI.

2. The method according to claim 1, wherein before notifying, by the PCF, the SMF corresponding to the activated PDU Session to deactivate the PDU Session activated by the UE, the method further comprises:

subscribing, by the PCF, with the AMF for service authorization of the UE.

3. The method according to claim 2, wherein before sending, by the AF, the service priority change information of the UE to the PCF, the method further comprises:

receiving and acquiring, by the AF, high-priority service subscription information sent by the UE; and sending, by the AF, the service priority change information of the UE to the PCF comprises:

sending, by the AF, the high-priority service subscription information of the UE to the PCF, wherein an NSI corresponding to the PDU Session activated by the UE is an NSI used by a normal-priority user, and an NSI corresponding to the new PDU Session is an NSI used by a high-priority user.

4. The method according to claim 2, wherein sending, by the AF, the service priority change information of the UE to the PCF comprises:

sending, by the AF, high-priority service subscription cancellation information of the UE to the PCF in a case where the AF determines that a high-priority service subscribed by the UE expires and has not been renewed or in a case where the AF receives high-priority service unsubscription information sent by the UE, wherein an NSI corresponding to the PDU Session activated by the UE is an NSI used by a high-priority user, and an NSI corresponding to the new PDU Session is an NSI used by a normal-priority user.

5. The method according to claim 1, wherein sending, by the AF, the service priority change information of the UE to the PCF comprises:

sending, by the AF, the service priority change information of the UE to the PCF via a Network Exposure Function (NEF).

6. The method according to claim 5, wherein before sending, by the AF, the service priority change information of the UE to the PCF, the method further comprises:

receiving and acquiring, by the AF, high-priority service subscription information sent by the UE; and sending, by the AF, the service priority change information of the UE to the PCF comprises:

sending, by the AF, the high-priority service subscription information of the UE to the PCF, wherein an NSI corresponding to the PDU Session activated by the UE is an NSI used by a normal-priority user, and an NSI corresponding to the new PDU Session is an NSI used by a high-priority user.

7. The method according to claim 5, wherein sending, by the AF, the service priority change information of the UE to the PCF comprises:

sending, by the AF, high-priority service subscription cancellation information of the UE to the PCF in a case where the AF determines that a high-priority service subscribed by the UE expires and has not been renewed or in a case where the AF receives high-priority service unsubscription information sent by the UE, wherein an NSI corresponding to the PDU Session activated by the UE is an NSI used by a high-priority user, and an NSI corresponding to the new PDU Session is an NSI used by a normal-priority user.

8. The method according to claim 1, wherein before sending, by the AF, the service priority change information of the UE to the PCF, the method further comprises:

receiving and acquiring, by the AF, high-priority service subscription information sent by the UE; and sending, by the AF, the service priority change information of the UE to the PCF comprises:

sending, by the AF, the high-priority service subscription information of the UE to the PCF, wherein an NSI corresponding to the PDU Session activated by the UE is an NSI used by a normal-priority user, and an NSI corresponding to the new PDU Session is an NSI used by a high-priority user.

9. The method according to claim 1, wherein sending, by the AF, the service priority change information of the UE to the PCF comprises:

sending, by the AF, high-priority service subscription cancellation information of the UE to the PCF in a case where the AF determines that a high-priority service subscribed by the UE expires and has not been renewed or in a case where the AF receives high-priority service unsubscription information sent by the UE, wherein an NSI corresponding to the PDU Session activated by the UE is an NSI used by a high-priority user, and an NSI corresponding to the new PDU Session is an NSI used by a normal-priority user.

10. The method according to claim 1, wherein the create session context request message further carries the first S-NSSAI, and the first S-NSSAI is used for subscription check.

11. A non-transitory computer-readable storage medium, on which a computer program is stored, wherein the computer program, when executed by a processor, causes the processor to implement the method for adjusting a service priority of a user according to claim 1.

12. A system for adjusting a service priority of a user, comprising: an Application Function (AF), a Policy Control Functionality (PCF), a Session Management function (SMF), an Access and Mobility Management function (AMF), and a Network Slice Selection Function (NSSF), wherein the AF is configured to send service priority change information of User Equipment (UE) to the PCF, wherein the UE has registered with a network and activated a Packet Data Unit Session (PDU Session), and a network slice identifier (S-NSSAI) registered by the UE in the network is a first S-NSSAI, and a Network Slice Instance (NSI) corresponding to the first S-NSSAI is an NSI corresponding to a normal service priority user;

the PCF is configured to notify the SMF corresponding to the activated PDU Session to deactivate the PDU Session activated by the UE;

the SMF corresponding to the activated PDU Session is configured to deactivate the PDU Session activated by the UE, and notify the UE to reestablish a PDU Session;

the AMF is configured to receive a PDU Session establishment request sent by the UE, wherein the PDU Session establishment request carries the first S-NSSAI; and send a service authorization request message to the PCF, wherein the service authorization request message comprises an identifier of the UE and the first S-NSSAI;

the PCF is further configured to modify the first S-NSSAI into a changed S-NSSAI corresponding to the service priority change information according to the service priority change information of the UE, and send a service authorization response message to the AMF, wherein the service authorization response message comprises the changed S-NSSAI;

the AMF is further configured to send a user slice information acquisition request message to an NSSF, wherein the user slice information acquisition request message comprises the changed S-NSSAI;

the NSSF is configured to send a user slice information acquisition response message to the AMF, wherein the user slice information acquisition response message carries NSI information corresponding to the changed S-NSSAI;

the AMF is further configured to select an SMF corresponding to an NSI corresponding to the changed S-NSSAI according to the changed S-NSSAI, the NSI information corresponding to the changed S-NSSAI and a data network name (DNN), and send a create session context request message to the SMF corresponding to the NSI corresponding to the changed S-NSSAI, wherein the create session context request message carries the changed S-NSSAI;

the SMF corresponding to the NSI corresponding to the changed S-NSSAI is configured to send a create session context response message to the AMF; and the SMF corresponding to the NSI corresponding to the changed S-NSSAI, and the AMF are further configured to establish a new PDU Session for the UE, wherein S-NSSAI of the new PDU Session is the changed S-NSSAI.

13. The system according to claim 12, wherein the PCF is further configured to subscribe with the AMF for service authorization of the UE before notifying the SMF corresponding to the activated PDU Session to deactivate the PDU Session activated by the UE.

14. The system according to claim 13, wherein the AF is further configured to receive and acquire high-priority service subscription information sent by the UE, and send the high-priority service subscription information of the UE to the PCF, wherein an NSI corresponding to the PDU Session activated by the UE is an NSI used by a normal-priority user, and an NSI corresponding to the new PDU Session is an NSI used by a high-priority user.

15. The system according to claim 13, wherein the AF is configured to send high-priority service subscription cancellation information of the UE to the PCF in a case of determining that a high-priority service subscribed by the UE expires and has not been renewed or in a case of receiving high-priority service unsubscription information sent by the UE, wherein an NSI corresponding to the PDU Session activated by the UE is an NSI used by a high-priority user, and an NSI corresponding to the new PDU Session is an NSI used by a normal-priority user.

16. The system according to claim 12, wherein the AF is configured to send the service priority change information of the UE to the PCF via a Network Exposure Function (NEF).

17. The system according to claim 16, wherein the AF is further configured to receive and acquire high-priority service subscription information sent by the UE, and send the high-priority service subscription information of the UE to the PCF, wherein an NSI corresponding to the PDU Session activated by the UE is an NSI used by a normal-priority user, and an NSI corresponding to the new PDU Session is an NSI used by a high-priority user.

18. The system according to claim 12, wherein the AF is further configured to receive and acquire high-priority service subscription information sent by the UE, and send the high-priority service subscription information of the UE to the PCF, wherein an NSI corresponding to the PDU Session activated by the UE is an NSI used by a normal-priority user, and an NSI corresponding to the new PDU Session is an NSI used by a high-priority user.

19. The system according to claim 12, wherein the AF is configured to send high-priority service subscription cancellation information of the UE to the PCF in a case of determining that a high-priority service subscribed by the UE expires and has not been renewed or in a case of receiving high-priority service unsubscription information sent by the UE, wherein an NSI corresponding to the PDU Session activated by the UE is an NSI used by a high-priority user, and an NSI corresponding to the new PDU Session is an NSI used by a normal-priority user.

20. The system according to claim 12, wherein the create session context request message further carries the first S-NSSAI, and the first S-NSSAI is used for subscription check.

* * * * *